United States Patent
Tamura et al.

[11] Patent Number: 6,043,793
[45] Date of Patent: Mar. 28, 2000

[54] GPS ANTENNA COVER

[75] Inventors: Nobuo Tamura; Takeshi Saito; Junichi Noro, all of Akita, Japan

[73] Assignee: Mitsumi Electric Co., Ltd., Tokyo, Japan

[21] Appl. No.: 09/141,419

[22] Filed: Aug. 27, 1998

[30] Foreign Application Priority Data

Aug. 29, 1997 [JP] Japan .................................... 9-249987

[51] Int. Cl.⁷ ...................................................... H01Q 1/42
[52] U.S. Cl. ..................................... 343/872; 343/700 MS
[58] Field of Search ............................ 343/700 MS, 713, 343/702, 711, 712, 872; H01Q 1/42

[56] References Cited

U.S. PATENT DOCUMENTS

| | | | |
|---|---|---|---|
| 4,728,962 | 3/1988 | Kitsuda et al. | 343/872 |
| 5,757,327 | 5/1998 | Yajima et al. | 343/713 |
| 5,844,529 | 12/1998 | Bell et al. | 343/872 |
| 5,896,107 | 4/1999 | Huynh | 343/700 MS |
| 5,900,845 | 5/1999 | Mandai et al. | 343/872 |

*Primary Examiner*—Don Wong
*Assistant Examiner*—Tho Phan
*Attorney, Agent, or Firm*—Whitham, Curtis & Whitham

[57] ABSTRACT

A GPS antenna cover comprises a box-like cover body formed by a top wall and four side walls, the cover body having an opened bottom, a GPS antenna receiving chamber defined by four inner walls extending perpendicularly from an inner face of the top wall toward the bottom, and a first holding member formed on and projecting inwardly from inner faces of the inner side walls for holding a GPS antenna unit from the side of the bottom, the GPS antenna unit inserted into the antenna receiving chamber through the bottom. The antenna receiving chamber includes a second holding member formed on and project inwardly from the inner face of the top wall for abutting against an upper face of the GPS antenna unit and urging the GPS antenna unit from the side of the top wall.

11 Claims, 4 Drawing Sheets

GPS ANTENNA COVER

BACKGROUND OF THE INVENTION

1. Technical Field of the Invention

The present invention relates to a GPS (Global Positioning System) antenna cover which contains a GPS antenna unit, and is mounted on an exterior equipment.

2. Description of the Related Art

GPS systems, which have been extensively used as a positioning system, need a GPS antenna for receiving radio waves from satellites in the constellation of GPS satellites. The installation of this GPS antenna must be done, using a horizontal surface as a reference, and when building a car-carried GPS system, the provision of a GPS antenna mounting mechanism is important.

A GPS antenna itself is flat, and small in size, and generally this antenna and a high-frequency circuit board (for effecting processings for the received radio waves, such as noise removal and amplification) are combined together to form a unit (GPS antenna unit), and this unit is contained in a cover (casing) made of a resin, and this product is mounted on an exterior equipment such as a bracket made of metal.

With respect to car-carried GPS antennas, it is expected that the ratio of genuine products (manufactured by car makers) to optional products, available in the after market, will become high. The genuine products, when to be mounted on a car body, require various brackets of different kinds, depending on the kind of cars, but the antenna maker can not know the configuration of the bracket until the specification of the car is decided by the car maker, and therefore the antenna maker can not spend much time in the development of a new product.

A conventional antenna cover comprises a box top cover, and a bottom cover for closing an opened bottom portion of the top cover after a GPS antenna unit is accommodated in the top cover, and the top cover and the bottom cover are fastened together, for example, by screws or an adhesive.

It is not easy to keep a stock of many kinds of car-carried GPS antenna covers, and also it is not easy to rapidly prepare and produce an antenna cover of a specification for use with a new kind of car. In the case where this antenna cover comprises two parts, that is, a top cover and a bottom cover, much time and labor are required for the assembling operation, and in the case where there are many kinds of antenna covers, there is encountered a problem that the number of the component parts to be stored is large. These are the problems to be solved by the invention.

SUMMARY OF THE INVENTION

It is an object of the present invention to provide a GPS antenna cover in which the antenna can be mounted on various kinds of exterior equipments with the use of the antenna cover of only one kind, and besides the number of component parts, as well as the time and labor required for an assembling operation, is reduced.

To achieve the above object, there is provided a GPS antenna cover which comprises: a box cover body formed by a top wall and four side walls, the cover body having an opened bottom; a GPS antenna receiving chamber defined by four inner walls extending perpendicularly from an inner face of the top wall toward the bottom; and a first holding member formed on and projecting inwardly from inner faces of the inner side walls for holding a GPS antenna unit from the side of the bottom, the GPS antenna unit inserted into the antenna receiving chamber through the bottom.

The antenna receiving chamber includes a second holding member formed on and projecting inwardly from the inner face of the top wall for abutting against an upper face of the GPS antenna unit and urging the GPS antenna unit from the side of the top wall.

The cover body includes an engagement member provided on the side wall and engaging with a mounting member provided on an exterior equipment on which the GPS antenna cover is mounted.

The engagement member may be formed on and projects outwardly from an outer face of the side wall, and the mounting member may engage with the engagement member from outside of the cover body.

The engagement member may be formed on and projects inwardly from an inner face of the side wall, and the mounting member may engage with the engagement member from inside of the cover body.

The engagement member may be formed on and projects outwardly from an outer face of the side wall and may be engaged with the mounting member by a screw.

DETAILED DESCRIPTION OF THE PREFERRED EMBODIMENTS

Figure 1:
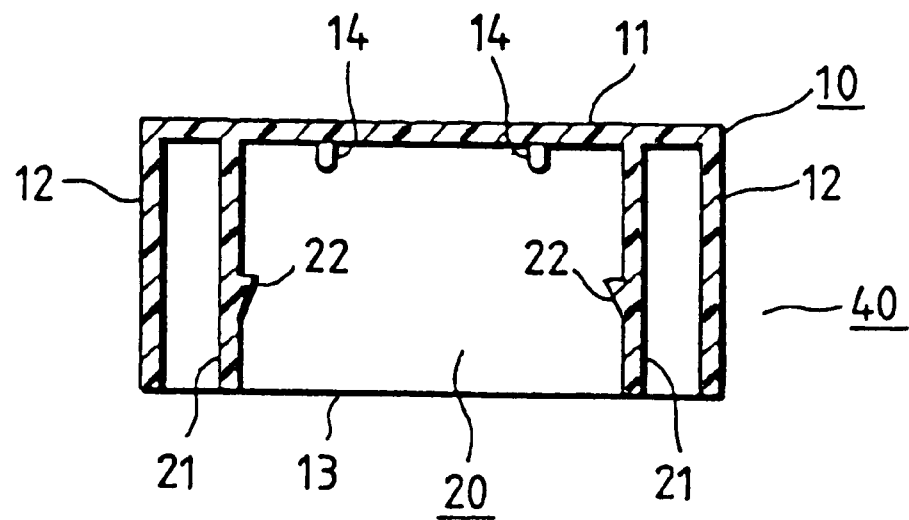
FIG. 1 is a cross-sectional view of one preferred embodiment of a GPS antenna cover of the present invention.
Figure 2:
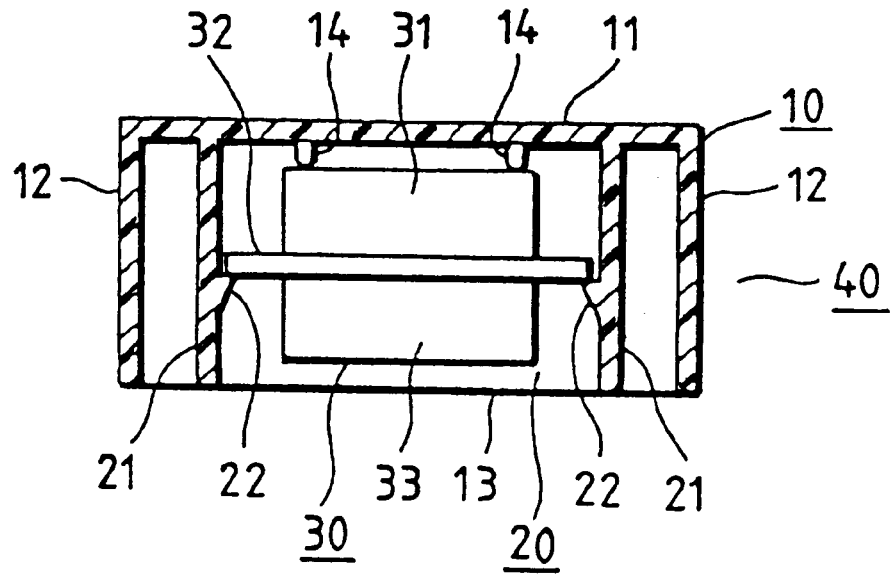
FIG. 2 is a cross-sectional view of the GPS antenna cover of FIG. 1 incorporating a GPS antenna unit.

A preferred embodiment of the present invention will now be described in detail with reference to the accompanying drawings. FIGS. 1 and 2 are cross-sectional views of one preferred embodiment of the invention. As shown in the drawings, a box cover body 10 is formed by a top wall 11 and four outer side walls 12, and has an opened bottom 13. A GPS antenna receiving chamber 20 is formed by four inner side walls 21 extending perpendicularly from the top wall 11 to the bottom 13. A plurality of engagement piece portions 22 are formed on and project inwardly from the inner walls 21, and these engagement piece portions 22 hold a GPS antenna unit 30 inserted into the antenna receiving chamber 20 through the bottom 13. These parts jointly constitute a GPS antenna cover 40 of the present invention.

The GPS antenna unit 30 comprises a flat GPS antenna element 31, a printed circuit board 32 mounted on a lower surface of this antenna element, and a shield casing 33 of metal which encloses high-frequency circuit parts (not shown), mounted on this printed circuit board, to shield the same. The printed circuit board 32, provided at a central portion of the GPS antenna unit 30, is engaged with the engagement piece portions 22, thereby supporting this GPS antenna unit 30 against disengagement from the antenna receiving chamber 20.

The antenna receiving chamber 20 has holding projections 14 which are formed on and project inwardly from the top wall 11 so as to abut against the upper surface of the antenna unit 30, and the antenna unit 30 is firmly fixed by the elasticity of the holding projections 14. Therefore, in the present invention, there is no need to provide a bottom cover for closing the opened bottom 13 of the antenna cover 10 (corresponding to the top cover of the conventional antenna cover).

Figure 3:
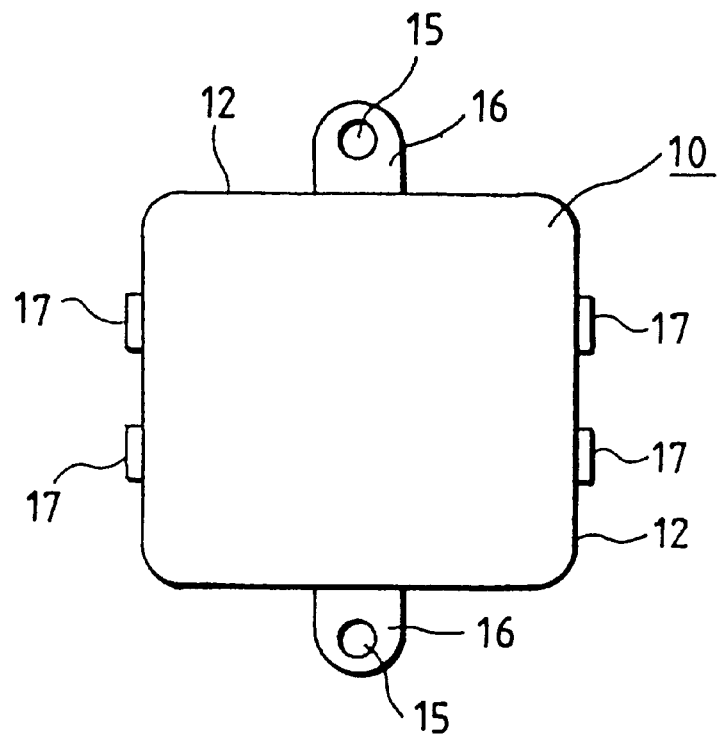
FIG. 3 is a plan view of another embodiment of a GPS antenna cover of the invention.
Figure 4:
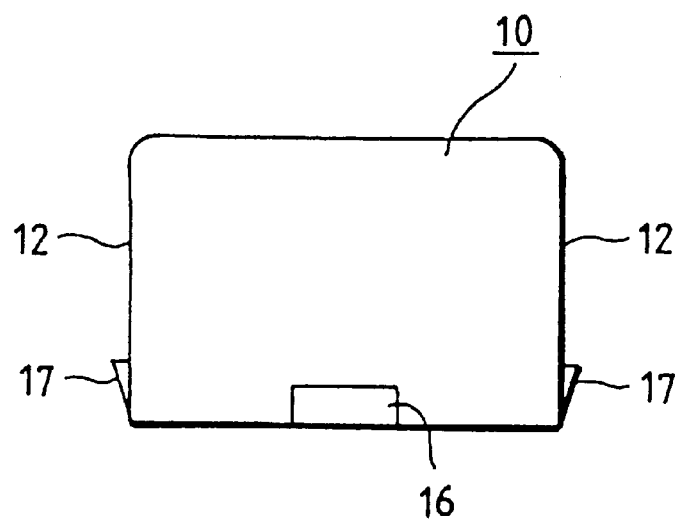
FIG. 4 is a side-elevational view of the GPS antenna cover of FIG. 3.
Figure 5:
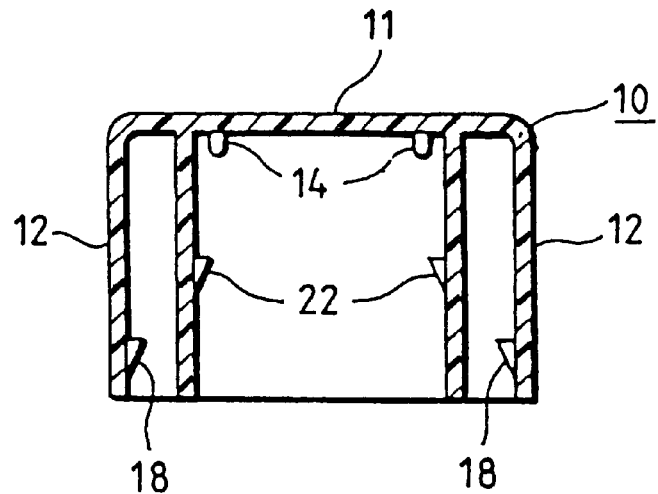
FIG. 5 is a cross-sectional view of the GPS antenna cover of FIG. 4.
Figure 6:
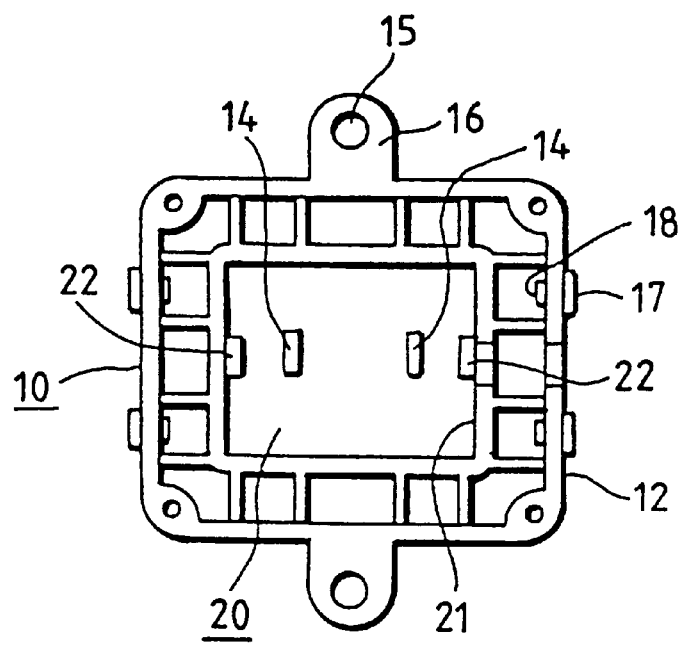
FIG. 6 is a rear view of the GPS antenna cover of FIG. 3.

FIG. 3 is a plan view of another embodiment of the present invention which differs from the embodiment of FIGS. 1 and 2 in that it further includes mounting means for mounting an antenna cover on an exterior equipment, FIG. 4 is a side-elevational view thereof, FIG. 5 is a vertical cross-sectional view of the antenna cover of FIG. 4, and FIG. 6 is a bottom view thereof.

As shown in FIGS. 3 and 6, a cover body 10 has fastening piece portions 16 formed on and projecting outwardly respectively from two of four outer side walls 12, and each fastening piece portion 16 has a screw hole 15 for holding a screw by which the antenna cover is fastened to the exterior equipment, such as a bracket. As shown in FIGS. 3, 4 and 6, the cover body 10 has mounting claws 17 formed on outer surfaces of the outer walls 12, and the antenna cover can be mounted on the exterior equipment through these mounting claws 17. As shown in FIGS. 5 and 6, mounting claws 18 are formed on inner surfaces of the outer walls 12, and the antenna cover can be mounted on the exterior equipment through these mounting claws 18.

Figure 7:
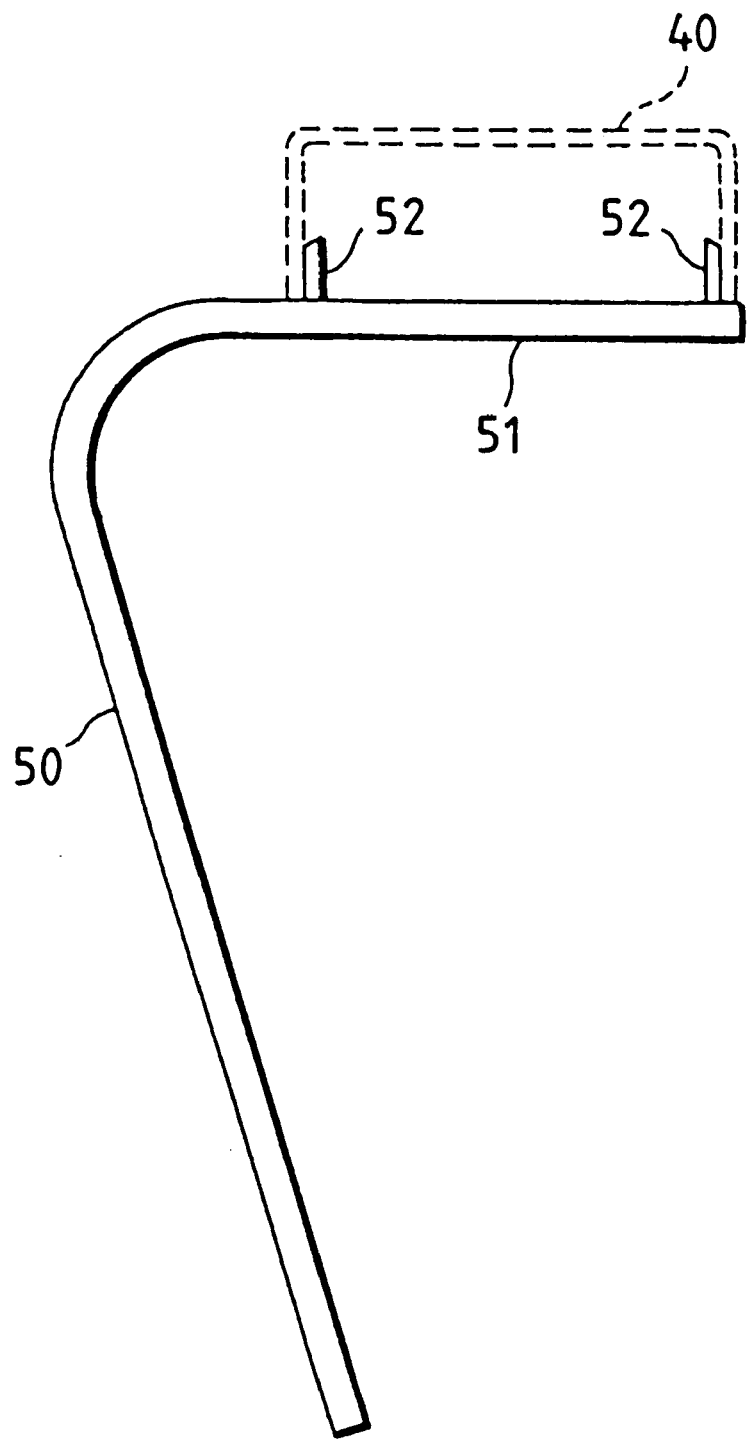
FIG. 7 is a side-elevational view of a bracket on which GPS antenna cover is mounted.

FIG. 7 is a side-elevational view of one example of a bracket 50 serving as an exterior equipment. An upper surface of a horizontal portion 51 of the generally inverted L-shaped bracket 50 serves as a mounting portion on which the GPS antenna cover 40 is mounted. The horizontal portion 51 has upstanding portion 52 formed thereon by stamping, and the antenna cover 40, containing the GPS antenna unit, is mounted horizontally on the horizontal portion 51 by the use of the upstanding portions 52. For example, in the case where each of the upstanding portions 52 has an engagement hole, and the bracket has such a configuration and size that the mounting claws 18, projecting from the inner surface of the antenna cover 40, can be utilized, the mounting claws 18 are engaged respectively in the engagement holes, formed respectively in the upstanding portions 52, in such a manner that the upstanding portions 52 are covered with the cover 40.

In the case where the distance between the upstanding portions 52 and 52 is larger than the outer size of the cover 40, the outer mounting claws 17 are utilized. In the case where the size of the cover 40 does not correspond to the distance between the upstanding portions 52 and 52, so that-the claws 17 and 18 cannot be utilized, screw holes are formed in the horizontal portion of the bracket 50, and the cover 40 is screw-fastened to the bracket, utilizing the fastening piece portions 16. In this manner, the antenna cover of the present invention can be mounted on the brackets of almost all kinds of cars.

As has been described heretofore, according to the present invention, there is provided the GPS antenna cover, in which the antenna can be mounted on various kinds of brackets with the use of the antenna cover of only one kind, and besides the number of the component parts, as well as the time and labor required for the assembling operation, is reduced.

What is claimed is:

1. A GPS antenna cover comprising:

a box cover body formed by a top wall and four outer side walls, the cover body having an open bottom;

a GPS antenna receiving chamber defined by four inner walls extending perpendicularly from an inner face of the top wall toward the bottom; and a plurality of first holding members formed on and projecting from inner faces of the inner walls for holding a GPS antenna unit within the GPS antenna receiving chamber and away from the open bottom, the GPS antenna unit inserted into the antenna receiving chamber through the bottom, the GPS antenna cover requiring no bottom cover.

2. The GPS antenna cover as set forth in claim 1, wherein the antenna receiving chamber includes a second holding members formed on and projecting inwardly from the inner face of the top wall for abutting against an upper face of the GPS antenna unit and urging the GPS antenna unit from the side of the top wall.

3. The GPS antenna cover as set forth in claim 1, wherein the cover body includes an engagement member provided on the outer side walls and engaging with a mounting member provided on an exterior equipment on which the GPS antenna cover is mounted.

4. The GPS antenna cover as set forth in claim 3, wherein the engagement member is formed on and projects outwardly from outer faces of the outer side walls and the mounting member engages with the engagement member from outside of the cover body.

5. The GPS antenna cover as set forth in claim 3, wherein the engagement member is formed on and projects inwardly from inner faces of the outer side walls and the mounting member engages with the engagement member from inside of the cover body.

6. The GPS antenna cover as set forth in claim 3, wherein the engagement member is formed on and projects outwardly from outer faces of the outer side walls and engaged with the mounting member by a screw.

7. A GPS antenna cover comprising:

a box cover body formed by a top wall and four outer side walls, the cover body having an open bottom;

a GPS antenna receiving chamber defined by four inner walls extending perpendicularly from an inner face of the top wall toward the bottom;

a plurality of first holding members formed on and projecting from inner faces of the inner walls for holding a GPS antenna unit within the GPS antenna receiving chamber and away from the open bottom, the GPS antenna unit inserted into the antenna receiving chamber through the bottom;

a plurality of second holding members formed on and projecting inwardly from the inner face of the top wall for abutting against an upper face of the GPS antenna unit and urging the antenna unit from the side of the top wall; and a plurality of engagement members provided on the outer side walls for engaging with a mounting member provided on an exterior equipment on which the GPS antenna cover is mounted.

8. The GPS antenna cover as set forth in claim 7, wherein the engagement members on the outer side walls are formed on and project outwardly from outer faces of the side walls, and the mounting member engages with the engagement members from outside the cover body.

9. The GPS antenna cover as set forth in claim 7, wherein the engagement members on the inner side walls are formed on and project inwardly from inner faces of the outer side walls, and the mounting member engages with the engagement members from inside of the cover body.

10. The GPS antenna cover as set forth in claim 7, wherein the engagement members on the outer side walls are formed on and project outwardly from outer faces of the outer side walls and engaged with the mounting member by screws.

11. The GPS antenna cover as set forth in claim 7, wherein the engagement members on the outer side walls comprise first engagement members formed on and projecting outwardly from outer faces of the side walls, and the mounting member frictionally engages with the first engagement members from outside the cover body, and second engagement members on the outer side walls formed on and projecting outwardly from opposite outer faces of the outer side walls and engaged with the mounting member by screws, and wherein the engagement members on the outer side walls are formed on and project inwardly from inner faces of the outer side walls, and the mounting member engages with the engagement members from inside of the cover body.

* * * * *